UNITED STATES PATENT OFFICE 3,054,817
Patented Sept. 18, 1962

3,054,817
PROCESS FOR THE PREPARATION OF ORGANOSILICON COMPOUNDS
Enrico J. Pepe, Kenmore, and Bernard Kanner, Tonawanda, N.Y., assignors to Union Carbide Corporation, a corporation of New York
No Drawing. Filed Dec. 31, 1959, Ser. No. 863,101
6 Claims. (Cl. 260—448.2)

This invention relates to a novel process for producing organosilicon compounds. More particularly this invention relates to a process of producing difunctional cyanoaryl- and cyanoalkylhalosilanes.

The cyano-containing difunctional halosilanes produced by the process of the invention are those of the formula (I) $$NC-R-\underset{\underset{Y_2}{|}}{\overset{\overset{R'}{|}}{Si}}-Y_2$$

where R is a divalent hydrocarbon radical, R' is a monovalent hydrocarbon radical and Y is fluorine or chlorine. Illustrative of the divalent hydrocarbon radicals that R represents are alkylene groups such as methylene, ethylene, propylene, isopropylene, isobutylene, octadecylene and the like; arylene groups such as phenylene, naphthylene, tolylene and the like. Illustrative of the monovalent hydrocarbon radicals that R' represents are alkyl groups such as methyl, ethyl, propyl, isobutyl, octadecyl and the like; aryl groups such as phenyl, naphthyl, tolyl, phenylethyl and the like, alkenyl groups such as vinyl, allyl, butenyl, hexenyl and the like. The cyano containing difuncional halosilanes are hereinafter referred to as cyano containing organosilicon compounds.

Heretofore it has been shown that difunctional cyanoalkylchlorosilanes can be prepared by the reaction of a cyanoalkene such as acrylonitrile with a dichlorosilane containing a silicon bonded hydrogen atom; however this method gives very low yields of the difunctional cyanoalkylchlorosilane.

It has also been shown that cyano-containing difunctional halosilanes of the Formula I can be prepared by the reaction of a Grignard reagent with the corresponding cyano-containing trihalosilane employing diethylether as the solvent and conducting the reaction at about 37° C.

Generally speaking, Grignard reactions of cyano-containing trihalosilanes react according to the following equations where R, R' and Y are as previously defined and X is halogen preferably chlorine, bromine or iodine:

(1) $$R'MgX + NCR-SiY_3 \longrightarrow NCR\underset{\underset{Y_2}{|}}{\overset{\overset{R'}{|}}{Si}}Y_2 + MgXY$$

2) $$R'MgX + NCR\underset{\underset{Y_2}{|}}{\overset{\overset{R'}{|}}{Si}}Y_2 \longrightarrow NCR\underset{\underset{Y}{|}}{\overset{\overset{R'_2}{|}}{Si}}Y + MgXY$$

(3) $$R'MgX + NCR\underset{\underset{Y}{|}}{\overset{\overset{R'_2}{|}}{Si}}Y \longrightarrow NCR-SiR'_3 + MgXY$$

It has been found that where the Grignard reaction is conducted according to the heretofore known processes that all three of the reactions take place. Thus it can be seen that this method of preparation has several disadvantages in that low yields of the cyano-containing difunctional halosilanes are obtained. Furthermore the mixtures of reaction products that are obtained are difficult to separate, thus rendering it difficult to obtain the desired cyano-containing difunctional halosilane in a high state of purity. In addition the cyano group is susceptible to attack by the Grignard reagent yielding byproducts ketones and alcohols.

We have discovered that cyano-containing organosilicon compounds of Formula I can be produced in unexpectedly high yields by the reaction of a Grignard reagent with a cyano containing trihalosilane of the formula $$NC-R-SiY_3$$

where R and Y are as above defined, when the reaction is conducted employing tetrahydrofuran as the solvent and the temperature of the reaction is maintained at from about −50° C. to +5° C.

The reaction procedure is essentially as follows:
A cyano-containing trihalosilane of the formula (II) $$NC-R-SiY_3$$

where R and Y are as above defined is dissolved in tetrahydrofuran and cooled to about −50° C. A solution of a Grignard compound of the formula R'MgX, where R' and X are as previously defined, in tetrahydrofuran is added slowly to the solution of the cyano containing trihalosilane with stirring while maintaining the temperature of the mixture below +5° C. After the addition is complete, the reaction mixture is then filtered free of precipitated salts and distilled to isolate the desired cyano-containing halosilanes of Formula I.

The temperature of the reaction mixture during the addition of the Grignard compound is critical. We have found that where the addition is made with the reaction mixture above a temperature of about 5° C., many side reactions such as previously described take place greatly reducing the yield of the desired products. We have found that reaction temperatures below about +5° C. are preferred since these side reactions are greatly minimized and the desired cyano-containing difunctional halosilanes are obtained in greater than 50 mole-percent yields. We have further found that where addition was made while maintaining the reaction temperature below about −30° C. that the highest yields of the desired products of Formula I were obtained. Temperatures below about −50° C. can be employed but no commensurate advantages is obtained thereby.

The amount of tetrahydrofuran employed as the solvent for the Grignard compound in the process is not narrowly critical and can range from one part by weight tetrahydrofuran to from 0.2 to 5.0 parts by weight of the Grignard compound.

The amount of tetrahydrofuran employed as the solvent for the cyano-containing trichlorosilane reactant in the process of the invention is not narrowly critical. The amount of tetrahydrofuran can range from about 5 parts by weight tetrahydrofuran to from about 1 to 5 parts by weight of the cyano-containing trihalosilane reactant.

Since it is desired to replace one halo atom of the cyano-containing trihalosilane with the R' group of the Grignard compound, at least one mole of the cyano-containing trihalosilane is generally employed for each mole of the Grignard compound used in the process of this invention. It is generally preferred to employ about 1.1 moles of the cyano-containing trihalosilane for each mole of the Grignard compound employed so as to minimize the formation of mono- and non-functional byproducts. In general the cyano containing difunctional halosilanes are readily isolated from the cyano-containing trihalosilanes. However, in the particular instance where cyano-containing (methyl) dihalosilanes are produced, separation by distillation is difficult. It is preferred about 0.9 mole of the cyano-containing trihalosilane for each mole of the methyl Grignard compound employed. In this way the cyano-containing trihalosilane is completely reacted and therefore the cyano-containing (methyl) dihalosilane is readily isolated by distillation.

The addition of the solution of the Grignard compound in tetrahydrofuran to the silane is preferably done in dropwise manner with rapid stirring in order to enable one to maintain the temperature of the Grignard compound-silane reaction within the above-defined limits, thus substantially reducing any side reactions.

Illustrative of the cyano-containing trihalosilanes of Formula II that can be employed as starting materials for the process of this invention are the cyanoalkyltrichlorosilanes, for example, alpha-cyanoethyltrichlorosilane, beta-cyanoethyltrichlorosilane, gamma-cyanopropyltrichlorosilane, beta-cyanopropyltrichlorosilane, omega-cyanoundecyltrichlorosilane, omega-cyanooctadecyltrichlorosilane and the like; the cyanoalkyltrifluorosilanes such as alpha-cyanoethyltrifluorosilane, beta - cyanoethyltrifluorosilane, gamma - cyanopropyltrifluorosilane, omega-cyanoundecyltrifluorosilane and the like; the cyanoaryltrichlorosilanes, cyanonaphthyltrichlorosilane, the cyanotolyltrichlorosilanes and the like; the cyanoaryltrifluorosilanes such as ortho, meta, para cyanophenyltrifluorosilane and the like.

Illustrative of the Grignard compounds of the formula R'MgX wherein R' and X are as previously defined that can be employed in the process of this invention are the alkyl magnesium halides such as methyl magnesium chloride, ethyl magnesium bromide, butyl magnesium iodide, octadecyl magnesium bromide and the like and the aryl magnesium halide such as phenyl magnesium chloride, naphthyl magnesium bromide, tolyl magnesium chloride, phenyl ethyl magnesium chloride and the like.

The Grignard compounds employed in the process of this invention can be prepared by the reaction of an alkyl halide or aryl halide with magnesium according to well known procedures.

The cyano containing difunctional halosilanes produced by the process of this invention are useful in the preparation of polysiloxane oils and gums and resins by known hydrolysis procedures. Such polysiloxane oils are useful as lubricants.

The following examples serve to further illustrate the invention and are not to be construed as limitations thereon.

EXAMPLE I

Beta-cyanoethyltrichlorosilane (660 g., 3.3 moles) dissolved in anhydrous tetahydrofuran (1.4 liters) was charged into a 2-liter-3-necked flask fitted with a stirrer, water cooled condenser, thermometer and dropping funnel. The flask was placed in a solid carbon dioxide-acetone bath and its contents cooled to approximately −55° C. while anhydrous nitrogen gas was passed over the solution. A 34 weight percent solution of methyl magnesium chloride in anhydrous tetrahydrofuran (prepared by the reaction of 3.3 moles of magnesium turning with excess i.e. greater than 3.3 mol. of methyl chloride in anhydrous tetrahydrofuran) was added with stirring over a 2 hour period while maintaining the temperature of the reaction mixture at about −50° C. The reaction mixture was then stirred for approximately 12 hours while the temperature rose to about −10° C. The reaction mixture was then filtered immediately. The filtrate was vacuum evaporated to remove tetrahydrofuran, methyl chloride and the like and refiltered. The filtrate from the second filtration was distilled under reduced pressure to yield 457 g. of mixed products (B.P. 50° C.–80° C. at 1.0 to 3.0 mm. Hg). The mixed products were distilled through a 20 plate column to yield beta-cyanoethyl(methyl)dichlorosilane in 70 mole-percent yield (B.P. 215° C. at 750 mm. Hg $n^{25}$ 1.4450, hydrolyzable chlorine 42.3%, theory 42.3%) based upon the amount of the beta-cyanoethyltrichlorosilane starting material employed.

EXAMPLE II

A reaction conducted according to the procedure of Example I but wherein beta-cyanoethyltrichlorosilane (254 g., 1.35 moles) was reacted with a 32 weight percent solution of ethyl magnesium chloride in tetrahydrofuran (prepared from 1.5 moles magnesium turnings and 1.5 moles of ethyl chloride in tetrahydrofuran) gave beta-cyanoethyl(ethyl)dichlorosilane (B.P. 234–5° C. to 760 mm. Hg) in 68 mol. percent yield based upon the amount of the beta-cyanoethyltrichlorosilane starting material employed.

EXAMPLE III

A reaction conducted according to the procedure of Example I but wherein beta-cyanoethyltrichlorosilane (518 g., 2.75 moles) was reacted with a 51 weight percent solution phenyl magnesium chloride in tetrahydrofuran [prepared by reacting chlorobenzene (310 g., 2.75 moles) with magnesium (2.75 moles) in tetrahydrofuran] gave beta-cynoethyl(phenyl)dichlorosilane in 55–60 mole percent yield based upon the amount of beta-cyanoethyltrichlorosilane starting material employed.

Table I sets forth the distribution of the reaction products of beta-cyanoethyltrichlorosilane with methyl, ethyl or phenyl-magnesium chloride where the reaction was conducted at −55° C. to −45° C. employing tetrahydrofuran as the solvent.

*Table I*

| R"MgCl [a] Where R" is | Mole—Percent Conversion [b] | | |
|---|---|---|---|
| | $NC(CH_2)_2(R")SiCl_2$ | $NC—(CH_2)_2(R')_2SiCl$ | $NC(CH_2)_2SiR"_3$ |
| Methyl | 70.0 | 5.2 | negligible. |
| Ethyl | 68.1 | 10.0 | Do. |
| Phenyl | 59.0 | 5.0 | Do. |

[a] Prepared by reacting equal molar amounts of R"Cl and Mg in tetrahydrofuran.
[b] Based upon the moles of beta-cyano-ethyltrichlorosilane starting material.

Table II shows the effect of temperature upon the reaction of a cyanoalkyltrihalosilane with a Grignard reagent employing equal molar ratios of beta-cyanoethyltrichlorosilane and a methyl magnesium halide.

*Table II*

| Moles $NC—(CH_2)_2SiCl_3$ | Moles $CH_3MgCl$ | Addition Temp., °C. | Solvent | Moles—Percent Conversion | |
|---|---|---|---|---|---|
| | | | | $\beta$-$NC$-$C_2H_4SiMe_2Cl$ [1] | $\beta$-$NC$-$C_2H_4SiMeCl_2$ [1] |
| 3.3 (Est) | 3.0–3.3 | −50 | tetra-hydrofuran | 5.2 | 70.0 |
| 3.2 | 3.2 | −25 | do | 12.5 | 53.8 |
| 1.68 | 1.68 | +5 | do | 16.8 | 51.8 |
| 1.0 | 1.0 | +30 | diethylether | [2] 26 | |

[1] In the above table, Me refers to a methyl group.
[2] Total yield of di- and monochlorosilane.

It has also been found that where a 3 to 1 molar ratio of beta-cyanoethyltrichlorosilane to methylmagnesium chloride was employed and the reactions conducted at 0°

C. in diethyl ether a yield of about 14 mole-percent of the beta-cyanoethyl(methyl)dichlorosilane was obtained.

What is claimed is:

1. A process for the production of cyano-containing organosilicon compounds of the formula

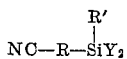

wherein R is a divalent hydrocarbon radical selected from the class consisting of alkylene and arylene radicals and R' is a monovalent hydrocarbon radical selected from the class consisting of alkyl, aryl and alkenyl groups and Y is a halogen selected from the class consisting of fluorine and chlorine which consists of dissolving in tetrahydrofuran an organosilicon compound of the formula $NC-R-SiY_3$ wherein R and Y are as above defined with a compound of the formula R'MgX wherein R' is as above defined and X is a halogen selected from the class consisting of iodine, bromine and chlorine and reacting the mixture at a temperature from about $-55°$ C. to $+5°$ C.

2. A process for the production of cyano-containing organosilicon compounds of the formula

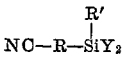

wherein R is a divalent hydrocarbon radical selected from the class consisting of alkylene and arylene radicals and R' is a monovalent hydrocarbon radical selected from the class consisting of alkyl, aryl and alkenyl groups, and Y is a halogen selected from the class consisting of fluorine and chlorine which comprises (1) dissolving in tetrahydrofuran an organosilicon compound of the formula $NC-R-SiY_3$ wherein R and Y are as above defined cooling the solution to about $-55°$ C. and (2) adding to the cooled solution, a tetrahydrofuran solution of a compound of the formula R'MgX wherein R' is as above defined and X is a halogen selected from the class consisting of chlorine, bromine and iodine, while maintaining the temperature of the reaction at a temperature of from about $-55°$ C. to $+5°$ C.

3. A process as claimed in claim 2 wherein the temperature of the reaction is maintained at from about $-55°$ C. to $-30°$ C.

4. A process for the production of beta-cyanoethyl(methyl)dichlorosilane which consists of reacting beta-cyanoethyltrichlorosilane with methyl magnesium chloride in the presence of tetrahydrofuran while maintaining the temperature from about $-55°$ C. to about $+5°$ C.

5. A process for the production of beta-cyanoethyl(ethyl)dichlorosilane which consists of reacting beta-cyanoethyltrichlorosilane with ethyl magnesium chloride in the presence of tetrahydrofuran while maintaining the temperature from about $-55°$ C. to about $+5°$ C.

6. A process for the production of beta-cyanoethyl(phenyl)dichlorosilane which consists of reacting beta-cyanoethyltrichlorosilane with phenyl magnesium chloride in the presence of tetrahydrofuran while maintaining the temperature from about $-55°$ C. to about $+5°$ C.

References Cited in the file of this patent

UNITED STATES PATENTS

| | | |
|---|---|---|
| 2,872,471 | Ramsden et al. | Feb. 3, 1959 |
| 2,894,012 | Ramsden et al. | July 7, 1959 |
| 2,913,472 | Prober | Nov. 17, 1959 |